United States Patent [19]

Shen et al.

[11] 3,923,859
[45] Dec. 2, 1975

[54] SUBSTITUTED FULVENE ACETIC ACIDS AND DERIVATIVES

[75] Inventors: Tsung-Ying Shen, Westfield; Howard Jones, Holmdel, both of N.J.

[73] Assignee: Merck & Co., Inc., Rahway, N.J.

[22] Filed: Aug. 31, 1973

[21] Appl. No.: 393,513

[52] U.S. Cl............. 260/465 D; 260/470; 260/209; 260/515 A; 260/247.2 B; 260/515 M; 260/250 A; 260/515 R; 260/251 R; 260/516; 260/256.4 R; 260/518 A; 260/282; 260/518 R; 260/287 R; 260/519; 260/291; 424/304; 260/294.8 C; 424/308; 260/294.9; 424/309; 260/295 R; 260/302 F; 260/307 R; 260/310 R; 260/326.12 R; 260/326.13 R; 260/326.14 R; 260/326.2; 260/329 R; 260/329 S; 260/329 AM; 260/332.2 A; 260/345.2; 260/345.7; 260/345.8; 260/346.2 R; 260/347.3; 260/347.4; 260/448 R; 260/464; 260/468 L; 260/468 J

[51] Int. Cl.$^2$........................... C07C 121/48
[58] Field of Search........ 260/465 D, 465 R, 465 E, 260/465 F, 465 G, 465 H

[56] References Cited
UNITED STATES PATENTS

| | | | |
|---|---|---|---|
| 3,655,693 | 4/1972 | Shen et al. | 260/465 D X |
| 3,657,432 | 4/1972 | Shen et al. | 260/465 D X |
| 3,682,968 | 8/1972 | Shen et al. | 260/465 D X |
| 3,732,292 | 5/1973 | Hinkley et al. | 260/465 G X |
| 3,737,455 | 6/1973 | Shen et al. | 260/465 R X |

*Primary Examiner*—Joseph P. Brust
*Attorney, Agent, or Firm*—Mario A. Monaco; Harry E. Westlake, Jr.

[57] ABSTRACT

This case is related to 5-(arylidene)-cyclopentadienyl-2-acetic acids and derivatives thereof of anti-inflammatory compounds. The compounds are prepared by direct condensation of an appropriate aldehyde to a cyclopentadienyl-2-acetate compound.

4 Claims, No Drawings

SUBSTITUTED FULVENE ACETIC ACIDS AND DERIVATIVES

SUMMARY OF THE INVENTION

This invention relates to novel 5-(arylidene)-cyclopentadienyl-2-acetic acids and derivatives thereof, to pharmaceutical compositions, to a method of treating fever, pain and inflammation by employing these acetic acid compounds and to a process for their preparation. The disclosed class of compounds in this invention are useful as anti-inflammatory agents and are effective in the prevention and inhibition of edema and granuloma tissue formation. They are also useful as anti-pyretic and analgesic agents.

BACKGROUND OF THE INVENTION

There has been much research carried on in the past two decades for development of anti-inflammatory drugs. As a result, a great many new drugs have been synthesized. Most of these have been steroids of the 11-oxygenated pregnane series. These, while highly effective, have the drawback of causing many side effects. There has also been a concentrated effort in anti-inflammatory research in the indole and indene series with the result of many useful drugs. Further, U.S. Pat. No. 3,312,730 discloses 1-arylidene indene acetic acids as anti-inflammatory compounds wherein the arylidene group is attached to an indene moiety in contrast to the present invention wherein the arylidene group is attached to a cyclopentadiene moiety.

I have found that these 5-(arylidene)cyclopentadienyl-2-acetic acids are valuable anti-inflammatory agents. These acetic acid compounds are substantially different from prior art compounds in that they are arylidene compounds of the cyclopentadiene series.

DESCRIPTION AND PREFERRED EMBODIMENTS

This invention therefore relates to a class of chemical compounds which contain an arylidene radical attached to a substituted cyclopentadiene acetic acid or derivative. The compounds are more specifically described by the following structural formula:

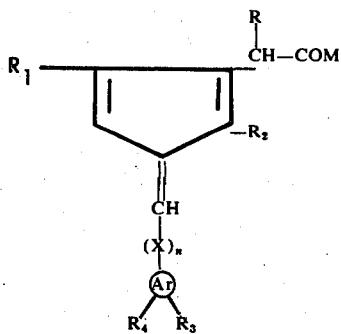

wherein:
R and $R_2$ are each hydrogen or alkyl;
$R_1$, $R_3$ and $R_4$ are each hydrogen, halogen, alkyl, alkoxy, amino, $C_{2-5}$ alkenyloxy, alkylamino, dialkylamino, alkylthio, alkylsulfinyl, alkylsulfonyl, trihaloalkyl, dialkylaminoalkyl, dialkylaminoalkoxy, cyano, alkanoyl, nitro, hydroxy, acyloxy, acylamino, aminoalkyl, alkylaminoalkyl, hydroxyalkyl, alkoxyalkyl, alkylmercaptoalkyl, aryl, aryloxy, aralkyl, sulfo or sulfonamido;

Ar is phenyl, or heteroaryl such as pyridyl, thienyl, furyl, thiazolyl or triazolyl; and
M is hydroxy, alkoxy, NR'R'' wherein R' and R'' are each hydrogen, or when R' and R'' are taken together they form a heterocyclic ring with the nitrogen;

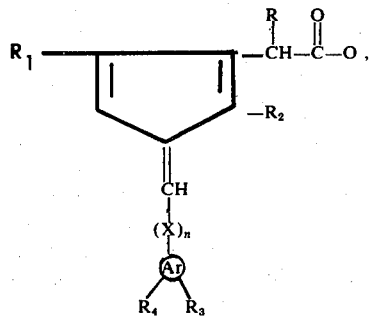

$\beta$-D-glucuronyloxy; and the pharamceutically acceptable salt of the acid;
X is alkylene, alkenylene, alkynylene, O, S, carbonyl, sulfinyl, sulfonyl, or $NR_5$ wherein $R_5$ is hydrogen or alkyl; and
n is 0 or 1.

In one aspect of the above invention, at least one of $R_1$, $R_3$ or $R_4$ is cyano, Ar is phenyl, and M is hydroxy, alkoxy, NR'R'' wherein R' and R'' are each hydrogen or $C_{1-5}$ alkyl.

In the preferred aspect of this invention:
R and $R_2$ are each hydrogen or $C_{1-5}$ alkyl;
$R_1$, is each hydrogen, halogen (chloro, bromo, fluoro), $C_{1-5}$ alkyl, $C_{1-5}$ alkoxy, $C_{2-5}$ alkenyloxy, amino, $C_{1-5}$ alkylamino, $C_{1-5}$ dialkylamino, $C_{1-5}$ alkylthio, $C_{1-5}$ alkylsulfinyl, $C_{1-5}$ alkylsulfonyl, trifluoromethyl, cyano, nitro, hydroxy, $C_{1-5}$ alkanoyloxy or $C_{1-5}$ alkanoylamino;
Ar is phenyl;
$R_3$ and $R_4$ are each hydrogen, halo, $C_{1-5}$ alkyl, $C_{1-5}$ alkylthio, cyano, nitro, trifluoromethyl, $C_{1-5}$ alkylsulfinyl, $C_{1-5}$ alkylsulfonyl, $C_{1-5}$ dialkylsulfonyl or $C_{1-5}$ alkoxy;
M is hydroxy, $C_{1-5}$ alkoxy or R', N, R'' wherein R' and R'' are each hydrogen or $C_{1-5}$ alkyl; and
n is 0; or the ammonium, alkali or alkali earth metal salt of the acid.

In the most preferred aspect of this invention:
R is hydrogen;
$R_2$ is $C_{1-5}$ alkyl such as methyl, ethyl, propyl and especially methyl;
$R_1$ is hydrogen, amino, $C_{1-5}$ dialkylamino (such as dimethylamino, diethylamino, methylethyiamino and dipropylamino), nitro, halo (such as chloro, bromo and fluoro), cyano, or $C_{2-5}$ alkenyloxy (such as allyloxy, propenyloxy or butenyloxy);
M is hydroxy or $C_{1-5}$ alkoxy;
Ar is phenyl;
n is 0;
$R_3$ and $R_4$ are each hydrogen, halo (especially chloro, bromo and fluoro), $C_{1-5}$ alkyl (such as methyl, ethyl or propyl), $C_{1-5}$ alkylthio (such as methylthio, ethylthio or propylthio), cyano, nitro, trifluoromethyl, $C_{1-5}$ alkylsulfinyl (such as methyl, ethyl or propylsulfinyl), $C_{1-5}$ alkylsulfonyl (such as methyl, ethyl or propylsulfonyl), $C_{1-5}$ dialkylsulfonyl (such as dimethyl, diethyl or dipropylsulfonyl) or $C_{1-5}$ alkoxy (such as methoxy, ethoxy or propoxy); and especially only one of $R_5$ and $R_4$ is other than hydrogen at any one time.

Representative compounds of the invention are:
3-amino-1-methyl-5-(p-methylthiobenzylidene cyclopentadiene)-2-acetic acid, 3-amino-1-methyl-5-(p-chlorobenzylidene cyclopentadiene)-2-acetic acid, 3-amino-1-methyl-5-(p-CF$_3$-benzylidene cyclopentadiene)-2-acetic acid, 3-amino-1-methyl-5-(m-ethylbenzylidene cyclopentadiene)-2-acetic acid, 3-amino-1-methyl-5-(p-methylsulfonylbenzylidene cyclopentadiene)-2-acetic acid, 3-amino-1-methyl-5-(p-dimethylsulfonylbenzylidene cyclopentadiene)-2-acetic acid, 3-amino-1-methyl-5-(p-methylsulfinylbenzylidene cyclopentadiene)-2-acetic acid, 3-amino-1-methyl-5-(o-nitro-p-chlorobenzylidene cyclopentadiene)-2-acetic acid, 3-amino-1-methyl-5-(o-methoxy-p-chlorobenzylidene cyclopentadiene)-2-acetic acid, 3-fluoro-1-methyl-5-(p-methylthiobenzylidene cyclopentadiene)-2-acetic acid, 3-fluoro-1-methyl-5-(p-chlorobenzylidene cyclopentadiene)-2-acetic acid, 3-fluoro-1-methyl-5-(p-CF$_3$-benzylidene cyclopentadiene)-2-acetic acid, 3-fluoro-1-methyl-5-(m-ethylbenzylidene cyclopentadiene)-2-acetic acid, 3-fluoro-1-methyl-5-(p-methylsulfonylbenzylidene cyclopentadiene)-2-acetic acid, 3-fluoro-1-methyl-5-(p-dimethylsulfonylbenzylidene cyclopentadiene)-2-acetic acid, 3-fluoro-1-methyl-5-(p-methylsulfinylbenzylidene cyclopentadiene)-2-acetic acid, 3-fluoro-1-methyl-5-(o-nitro-p-chlorobenzylidene cyclopentadiene)-2-acetic acid and 3-fluoro-1-methyl-5-(o-methoxy-p-chlorobenzylidene cyclopentadiene)-2-acetic acid.

The compounds of the instant invention can be used to treat inflammation by reducing inflammation and relieving pain in such diseases as rheumatoid arthritis, osteoarthritis, gout, infectious arthritis and rheumatic fever. The compounds can also be used as an anti-pyretic and would be administered and used in the same manner and in the same dosage ranges as if they were being used to treat inflammation as discussed further on.

The treatment of inflammation in accordance with the method of the present invention is accomplished by topically, orally, rectally or parenterally administering to patients a composition of the instant compounds, particularly the especially preferred compounds in a nontoxic pharamceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, cab-o-sil and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup, an aqueous solution or a liquid suspension. Suppositories may be prepared in a conventional manner by mixing the compounds of this invention with a suitable non-irritating excipient which is solid at room temperature, but liquid at the rectal temperature. Such materials are cocoa butter and polyethylene glycol. Gels and lotions for topical application may be prepared in conventional manners.

The compounds of the invention and of the compositions of this invention are to be administered in an amount sufficient to treat inflammation, that is, to reduce inflammation. Advantageously, the compositions will contain the active ingredient in an amount of from about 0.1 mg. to 50 mg. per kg. body weight per day (5 mg. to 3.5 g. per patient per day), preferably from about 1 mg. to 15 mg. per kg. body weight per day (50 mg. to 1 g. per patient per day).

The method of treatment of this invention comprises administering to a patient (animal or human) a compound of the invention, particularly an especially preferred compound admixed with a non-toxic pharmaceutical carrier such as exemplified above. The compounds will be administered in an amount of from 0.1 mg. to 50 mg. per kg. body weight per day, preferably from about 1 mg. to about 15 mg. per kilogram body weight per day. The most rapid and effective anti-inflammatory effect is obtained from oral administration of a daily dosage of from about 1 to 15 mg./kg./day. It should be understood, however, that although preferred dosage ranges are given, the dose level for any particular patient depends upon the activity of the specific compound employed. Also, many other factors that modify the actions of drugs will be taken into account by those skilled in the art in the therapeutic use of medicinal agents, particularly those of this invention, for example, age, body weight, sex, diet, time of administration, route of administration, rate of excretion, drug combination, reaction sensitivities and severity of the particular disease.

The process for preparing the compounds of this invention is another aspect of the invention and included herein. The process encompasses the condensation of an appropriate pentadienyl-2-acetate ester with an aldehyde to form the desired 5-arylidene ester and hydrolysis of the ester to form the desired acid. The free acid may then be treated with an amine to form the amides or treated with an alkali or alkali earth base to form salts of the acid. The condensation is carried out by reaction of the cyclopentadienyl ester with a strong base such as sodium hydride, metallic potassium or sodium or phenyl lithium in the presence of an inert solvent such as benzene, loweralkyl ethers, tetrahydrofuran or dioxan at a temperature of from 0° to room temperature followed by the addition of the aldehyde and further reaction at a temperature of from 0° to 70° to yield the desired 5-benzylidene cyclopentadienyl-2-acetate compound. Hydrolysis of this compound to form the free acid is carried out under conditions well known to the art such as reaction of the ester in a solvent in the presence of a base such as NaOH, KOH, NaOMe in ethanol, methanol, water, etc., at a temperature of from room temperature to 100° and preferably at or near the reflux temperature of the solvent until hydrolysis is complete. Alternatively, the ester may be hydrolyzed under basic conditions as is well known in the art. The free acid thus obtained may be converted to its corresponding amide by reaction with an agent to convert the acid to the acid halide such as thionyl chloride, sulfinyl chloride or PCl$_3$ in PCl$_5$ if desired in an inert solvent at a temperature of from room temperature to 100° followed by the addition of the appropriate amine and further reacted at a temperature of from 0° to room temperature to form the desired amide. Similarly, the acid may be converted to the corresponding salt by well known means.

The cyclopentadienyl acetate employed to prepare the compounds of this invention may be prepared in the following manner: Cyclopentadienyl acetic acid or fractional derivatives thereof is converted to its corresponding ester by normal esterification techniques such as reaction of the acid at elevated temperatures with the appropriate alcohol in the presence of a strong acid. At this point, various functional groups may be added to the cyclopentadiene ring such as a nitro group, by normal nitration procedures, and an amino group by the reduction of the nitro group. Further, the hydroxy group may be obtained by diazotization of the amine in aqueous dioxan at 70°100°; the methoxy group by diazotization at 100° in methanol; the mercapto compounds via the diazotization of the amines through the xanthogenates followed by base cleavage; and the methylsulfinyl compound by oxidation of the methylthio compound obtained by treatment of the mercaptams with base, followed by reaction with methyl iodide. After the appropriate functional groups have been inserted, the cyclopentadienyl acetate compound is condensed with an appropriate aldehyde as previously described.

The following examples are given by way of illustration:

EXAMPLE 1

3-Amino-1-methyl-5-(p-methylsulfinylbenzylidene cyclopentadienyl)-2-acetic acid

A. Ethyl 1-methylcyclopentadiene-2-acetate

A solution of bromine (0.5 m.) in carbon tetrachloride (100 ml.) is slowly run into a solution of the 2-methyl-cyclopent-2-ene-1-acetic acid (0.45 m.) in carbon tetrachloride (200 ml.) at 0°–15° with stirring under nitrogen. When all the bromine color had been expelled the solvent is evaporated off and the residual oil is refluxed for 4 hours in 95% ethanol (100 ml.) containing (0.6 m.) sodium acetate. After this time, the solution is evaporated to dryness, the residue taken up in ethyl acetate (300 ml.) and washed well with water. The organic layer is dried ($MgSO_4$), filtered and evaporated to dryness to give a mixture of 1-methylcyclopentadiene-2-acetic acid and 2-methylcyclopentadiene-1-acetic acid. The mixture of acids is refluxed in ethanol (100 ml.) containing (0.5 ml.) concentrated sulfuric acid for 2 hours and then evaporated to 1/5 volume. After the residue is poured into saturated sodium bicarbonate (200 ml.), it is extracted into ether (3 × 60 ml.) and the combined ether layers washed with water (1 × 50 ml.). The ether layer is separated, dried ($MgSO_4$), filtered and evaporated to dryness. The residue is chromatographed on silica-gel (2 ft. × 2 ½ in.) Baker Analysed 60–100mesh, using solutions of n-hexane ether as eluates. In this way, ethyl 1-methylcyclopentadiene-2-acetate is obtained pure.

B. Ethyl 1-methyl-3-nitrocyclopentadienyl-2-acetate

A cold solution of potassium nitrate (0.2 m.) in concentrated sulfuric acid (200 ml.) is added over 3 hours to an ice-cold solution of the ester (0.2 m.) in concentrated sulfuric acid (70 ml.) with stirring so that the temperature does not rise above 10°. At the end of this time the temperature is brought carefully to room temperature over 2 hours. The solution is poured into ice (2 gallons) and extracted with ether (3 × 600 ml.). The ether solution is washed with saturated sodium bicarbonate (2 × 300 ml.), water (1 × 600 ml.), separated and dried ($MgSO_4$). It is then filtered and the filtrate evaporated to give an oil. The oil is chromatographed on silica-gel (Baker Analysed 60–100 mesh, 2 ft. × 1 ½ in.) using solutions of ether-n-hexane as eluants. In this way, a fraction solely containing ethyl 1-methyl-3-nitrocyclopentadienyl-2-acetate is obtained and it is evaporated to dryness.

C. Ethyl 1-methyl-3-aminocyclopentadienyl-2-acetate lithium

To the above compound (0.1 m.) in dry tetrahydrofuran (75 ml.) is added a solution of n-butyl lithium in n-hexane (21.9% 12 ml.) under nitrogen with stirring at 5°–10°. This solution is then hydrogenated over Pd/C (10% 0.5 gm.) at room temperature and 42 p.s.i. hydrogen pressure until the 3 mole theoretical amount of hydrogen has been taken up. This solution is filtered and is then used in the next reaction.

D. Ethyl 3-amino-1-methyl-5-(p-methylsulfinylbenzylidene cyclopentadiene)-2-acetate A solution of p-methylsulfinylbenzaldehyde (0.1 m.) in dry tetrahydrofuran (50 ml.) is run into the stirred solution described in Part C above at room temperature under nitrogen. After 3 hours, the solution is added to saturated aqueous ammonium chloride (200 ml.) and immediately extracted with ethyl acetate (3 × 200 ml.), water and dried ($MgSO_4$). The filtered solution is evaporated to dryness and the residual oil stirred in refluxing benzene (100 ml.) with phosphorous pentoxide (2 gm.) for 20 minutes. The benzene mixture is filtered, the filtrate washed with saturated sodium bicarbonate solution (2 × 50 ml.), water (1 × 25 ml.) and dried ($MgSO_4$). The solution is filtered and evaporated to dryness to give ethyl 3-amino-1-methyl-5-(p-methylsulfinylbenzylidene cyclopentadiene)-2-acetate.

E. 3-Amino-1-methyl-5-(p-methylsulfinylbenzylidene cyclopentadiene)-2-acetic acid The above ester (0.2 mole) in a solution of 2.5 N sodium hydroxide in 1:1 ethanol-water (50 ml.) is stirred under nitrogen at room temperature for 2 hours. The ethanol is evaporated off at 20° and the residual solution extracted with ether (2 × 50 ml.). The aqueous solution is pumped free of ether and acidified with 2.5 N hydrochloric acid. The acid precipitates and is collected, washed with water and dried.

EXAMPLE 2

3-Dimethylamino-1-methyl-5-(p-methylsulfinylbenzylidene cyclopentadienyl)-2-acetic acid A. Ethyl 1-methyl-3-dimethylaminocyclopentadienyl-2-acetate The solution of the product from Example 1 Part B is evaporated to ⅓ volume and poured into ice. The residual aqueous solution is extracted with ethyl acetate (3 × 50 ml.) and the organic phase dried ($MgSO_4$), filtered and hydrogenated over 10% Pd/C (0.75 gm.) in formic acid (100 ml.) and 37% aqueous formaldehyde (7.5 gm. 0.2 mole) at room temperature and 42 p.s.i. When the theoretical amount of 2 moles of hydrogen has been taken up, the hydrogenation solution is filtered, evaporated to 1/5 volume, poured into saturated sodium bicarbonate solution (300 ml.) and the aqueous solution is extracted with ether (3 × 100 ml.). The combined ether layers are washed with water (2 × 50 ml.), dried ($MgSO_4$), filtered and evaporated to dryness to give ethyl 1-methyl-3-dimethylaminocyclopentadienyl-2-acetate.

B. Ethyl 3-dimethylamino-1-methyl-5-(p-methylsulfinylbenzylidene cyclopentadienyl)-2-acetate To a solution of ethyl 1-methyl-3-dimethylamino cyclopentadiene-2-acetate (0.1 m.) in dry tetrahydrofuran (75 ml.) is added a solution of n-butyl lithium in n-hexane (21.9% 12 ml.) under nitrogen with stirring at 5° to 10°. A solution of p-methylsulfinylbenzaldehyde (0.1 mole) in dry tetrahydrofuran (50 ml.) is run in after 15 minutes over 30 minutes and the reaction is kept at room temperature overnight. The work up is exactly analogous to Example 1, Part D to give the title compound.

C. 3-Dimethylamino-1-methyl-5-(p-methylsulfinylbenzylidene cyclopentadienyl)-2-acetic acid The reaction described in Example 1, Part E is repeated on ethyl 3-dimethylamino-1-methyl-5-(p-methylsulfinylbenzylidene cyclopentadienyl)-2-acetate (0.1 mole) to give 3-dimethylamino-1-methyl-5-(p-methylsulfinylbenzylidene cyclopentadienyl)-3-acetic acid.

Similarly when an equivalent amount of ethyl 1-methylcyclopentadiene-2-acetate and ethyl 1-methyl-3-nitrocyclopentadiene-2-acetate obtained from Example 1 is used in place of ethyl 1-methyl-3-dimethylamino cyclopentadiene-2-acetate in Part B above and the product therefrom carried through Part C above, there is obtained 1-methyl-5-(p-methylsulfinylbenzylidene cyclopentadienyl)-2-acetic acid and 1-methyl-3-nitro-5-(p-methylsulfinylbenzylidene cyclopentadienyl)-2-acetic acid, respectively.

Similarly when an equivalent amount of
p-methylthiobenzaldehyde,
p-methylsulfinylcinnamaldehyde,
p-methylsulfinylphenylglyoxal,
p-methylsulfinylproparagaldehyde,
isonicotinaldehyde,
4-chlorobenzaldehyde,
2-chlorobenzaldehyde,
4-bromobenzaldehyde,
2,4-dichloro or dibromobenzaldehyde,
4-methyl, ethyl, propyl, i-propyl, butyl or t-butylbenzaldehyde,
4-fluorobenzaldehyde,
4-trifluoromethylbenzaldehyde,
3-trifluoromethylbenzaldehyde,
4-dimethylsulfamylbenzaldehyde,
4-methylsulfonylbenzaldehyde,
2-nitrobenzaldehyde,
2-methoxybenzaldehyde,
4-methylsulfamylbenzaldehyde,
2-nitro-4-chlorobenzaldehyde,
2-methoxy-4-chlorobenzaldehyde,
2-nitro-4-methylbenzaldehyde,
2-nitro-4-fluorobenzaldehyde,
2-nitro-4-methoxybenzaldehyde,
p-anisaldehyde,
salicylaldehyde,
vanillin,
p-terephthalaldehydic acid amides (e.g., the methyl, dimethyl, methylethyl and diethylamides),
pyridine 2,3 and 4-aldehydes,
thiophene 2 or 3-aldehydes,
pyrazine aldehyde,
pyrrol-2-aldehyde,
furfural,
pyrimidine-2-aldehyde,
α and β-naphthaldehyde,
benzothiazol-2-aldehyde,
3-nitrothiophene-2-aldehyde,
furyl-2-aldehyde,
1-methylpyrrol-2-aldehyde,
thiazole-2-aldehyde,
1-methylpyrazole-5-aldehyde,
oxazole-4-aldehyde,
5-styryl-6-ethoxyoxazole-2-aldehyde,
1-methylpyridine-4-aldehyde,
2-ethoxypyrane-3-aldehyde,
1-phenylpyridazine-6-aldehyde,
1-methylindole-3-aldehyde,
5-chlorobenzo-3-aldehyde,
thionaphthene-3-aldehyde,
benzofuran-5-aldehyde,
1-methylbenzimidazole-2-aldehyde,
7-aza-indole-3-aldehyde,
3-methylbenzopyrane,
quinoline and 8-aldehydes,
isopuinoline-4-aldehyde,
quinoxaline-2-aldehyde,
naphthyridine-2-aldehyde,
benzoxazole-2-aldehyde,
are used in place of p-methylsulfinylbenzaldehyde in Example 1 D and C and 2 B and C above, there is obtained the corresponding 3-amino-1-methyl-5-(arylidene cyclopentadiene)-3-acetic acid and 3-dimethylamino-1-methyl-5-(arylidene cyclopentadiene)-3-acetic acids, respectively.

EXAMPLE 3

3-Chloro-1-methyl-5-(p-methylsulfinylbenzylidene cyclopentadienyl)-2-acetic acid A. Ethyl 1-methyl-3-chlorocyclopentadienyl-2-acetate Gasious chlorine is bubbled through a solution of ethyl 1-methylcyclopentadiene-2-acetate (prepared in Example 1 A above, 0.7 mole) being stirred over aluminum oxide. The solution is slowly heated to 100° and kept there for 1 hour, cooled and filtered. The crude product is then vapor phase chromatographically purified on a Wilkens preparative scale interment using a 1 × 1 m. column of 5% Apiezon M or Chromosorb W. In this way, a pure sample of the title compound is obtained.

B. 3-Chloro-1-methyl-5-(p-methylsulfinylbenzylidene cyclopentadienyl)-2-acetic acid The compound thus obtained from Example 3 A above is reacted in accordance with Example 1 C to 1 E to obtain the desired compound.

Similarly when the aldehydes mentioned below and ethyl 3-chloro-1-methylcyclopentadiene-2-acetate are reacted in accordance with Example 1 C to 1 E, there is obtained the below mentioned final products.

| Aldehyde Used | Product |
| --- | --- |
| p-methylsulfinylcinnamaldehyde | 3-chloro-1-methyl-5-(p-methylsulfinylcinnamylidene cyclopentadienyl)-2-acetic acid |
| p-methylsulfinylpropargaldehyde | 3-chloro-1-methyl-5-(p-methylsulfinylpropargylidene cyclopentadienyl)-2-acetic acid |
| p-chlorobenzaldehyde | 3-chloro-1-methyl-5-(p-chlorobenzylidene cyclopentadienyl)-2-acetic acid |
| p-fluorobenzaldehyde | 3-chloro-1-methyl-5-(p-fluorobenzylidene cyclo- |

| Aldehyde Used | Product |
|---|---|
| | pentadienyl)-2-acetic acid |
| p-methylthiobenzaldehyde | 3-chloro-1-methyl-5-(p-methylthiobenzylidene cyclopentadienyl)-2-acetic acid |
| p-methylsulfinylphenylglyoxal | 3-chloro-1-methyl-5-(p-methylsulfinylphenacylidene cyclopentadienyl)-2-acetic acid |
| isonicotinaldehyde | 3-chloro-1-methyl-5-(p-isonicotinylidene cyclopentadienyl)-2-acetic acid |

Similarly when the other aldehydes mentioned in Example 2 are reacted with ethyl 3-chloro-1-methylcyclopentadiene-2-acetate in accordance with Example 1 C to 1 E there are obtained the corresponding 3-chloro-1-methyl- 5-(arylidenecyclopentadienyl)-2-acetic acid compounds.

EXAMPLE 4

3-Cyano-1-methyl-5-(p-methylsulfinylbenzylidene cyclopentadienyl)-2-acetic acid

A. Ethyl 1-methyl-3-cyanocyclopentadienyl-2-acetate

A mixture of ethyl 1-methyl-3-chlorocyclopentadienyl-2-acetate (0.3 mole), cuprous cyanide (0.5 mole) in N-methyl pyrrolidine (200 ml.) are refluxed with stirring under nitrogen at 200° for 12 hours. After this time, 40 ml. of a solution of 400 g. ferric chloride in 600 ml. $H_2O$ and 100 ml. concentrated hydrochloric acid is run in and the reaction mixture kept warm for 1 hour. The organic material is extracted into ethyl acetate (3 × 200 ml.), the combined organic layers are washed with saturated sodium bicarbonate solution (2 × 70 ml.), water (2 × 50 ml.), separated and dried ($MgSO_4$). The filtered solution is evaporated to dryness and chromatographed on a column of silica-gel (2 ft. × 2 in.) using solutions of n-hexane-ether alcohol as eluants to obtain ethyl 1-methyl-3-cyanocyclopentadienyl-2-acetate.

B. 3-Cyano-1-methyl-5-(p-methylsulfinylbenzylidene cyclopentadienyl)-2-acetic acid The procedure of Example 2 B is used replacing ethyl 1-methyl-3-dimethylamino cyclopentadiene-2-acetate with an equivalent amount of 3-cyano-1-methylcyclopentadiene-2-acetate and the product therefrom reacted in accordance with Example 2 C to obtain the subject compound.

Similarly when the aldehydes mentioned below and ethyl 1-methyl-3-cyanocylopentadienyl-2-acetate are reacted in accordance with Examples 2 B and C, there is obtained the below mentioned final products.

| Aldehydes Used in 8E | Product Obtained in 8F |
|---|---|
| p-methylsulfinylcinnamaldehyde | 3-cyano-1-methyl-5-(p-methylsulfinylcinnamylidene cyclopentadienyl)-2-acetic acid |
| p-methylsulfinylpropargaldehyde | 3-cyano-1-methyl-5-(p-methylsulfinylpropargylidene cyclopentadienyl)-2-acetic acid |
| p-chlorobenzaldehyde | 3-cyano-1-methyl-5-(p-chlorobenzylidene cyclopentadienyl)-2-acetic acid |
| p-fluorobenzaldehyde | 3-cyano-1-methyl-5-(p-fluorobenzylidene cyclopentadienyl)-2-acetic acid |
| p-methylthiobenzaldehyde | 3-cyano-1-methyl-5-(p-methylthiobenzylidene cyclopentadienyl)-2-acetic acid |
| p-methylsulfinylphenylglyoxal | 3-cyano-1-methyl-5-(p-methylsulfinylphenacylidene cyclopentadienyl)-2-acetic acid |
| isonicotinaldehyde | 3-cyano-1-methyl-5-(p-isonicotinylidene cyclopentadienyl)-2-acetic acid |

Similarly when the other aldehydes mentioned in Example 2 are reacted with ethyl 3-cyano-1-methylcyclopentadiene-2-acetate in accordance with Examples 1 C to 1 E, there are obtained the corresponding 3-cyano-1-methyl-5-(arylidene cyclopentadienyl)-2-acetic acid compounds.

EXAMPLE 5

3-Fluoro-1-methyl-5-(p-methylsulfinylbenzylidene cyclopentadienyl)-2-acetic acid A. Ethyl 1-methyl-3-fluorocyclopentadienyl-2-acetate A mixture of ethyl 1-methyl-3-chlorocyclopentadienyl-2-acetate (0.4 mole) and dry potassium fluoride (0.5 mole) are stirred under nitrogen and heated in dry N-methylpyrrolidine (200 ml.) at about 200° for 24 hours.

The reaction mixture is extracted with water (3 × 300 ml.) from ether (700 ml.) and the organic layers combined, dried ($MgSO_4$) and filtered. The filtrate is evaporated on light vacuum at 80° to remove N-methyl pyrrolidine and chromatographed on silica-gel (80–100 mesh) 3 ft. × 2 in. using mixtures of ether-n-hexane alcohol as eluants to yield 1-methyl-3-fluorocyclopentadienyl-2-acetate.

B. 3-Fluoro-1-methyl-5-(p-methylsulfinylbenzylidene cyclopentadienyl)-2-acetic acid The procedure of Example 2 B is used replacing ethyl 1-methyl-3-dimethylamino cyclopentadiene-2-acetate with an equivalent amount of ethyl 1-methyl-3-fluoro cyclopentadiene-2-acetate and the product therefrom reacted in accordance with Example 2 C to obtain the subject compound.

Similarly when the aldehydes mentioned below and ethyl 1-methyl-3-fluoro cyclopentadienyl-2-acetate are reacted in accordance with Examples 2 B and C, there is obtained the below mentioned products.

| Aldehyde Used | Product |
|---|---|
| p-methylsulfinylcinnamaldehyde | 3-cyano-1-methyl-5-(p-methylsulfinylcinnamylidene cyclopentadienyl)-2-acetic acid |
| p-methylsulfinylpropargaldehyde | 3-cyano-1-methyl-5-(p-methylsulfinylpropargylidene cyclopentadienyl)-2-acetic acid |

-continued

| Aldehyde Used | Product |
| --- | --- |
| p-chlorobenzaldehyde | 3-cyano-1-methyl-5-(p-chlorobenzylidene cyclopentadienyl)-2-acetic acid |
| p-fluorobenzaldehyde | 3-cyano-1-methyl-5-(p-fluorobenzylidene cyclopentadienyl)-2-acetic acid |
| p-methylthiobenzaldehyde | 3-cyano-1-methyl-5-(p-methylthiobenzylidene cyclopentadienyl)-2-acetic acid |
| p-methylsulfinylphenylglyoxal | 3-cyano-1-methyl-5-(p-methylsulfinylphenacylidene cyclopentadienyl)-2-acetic acid |
| isonicotinaldehyde | 3-cyano-1-methyl-5-(p-isonicotinylidene cyclopentadienyl)-2-acetic acid |

Similarly when the other aldehydes mentioned in Example 2 are reacted with ethyl 3-fluoro-1-methyl cyclopentadiene-2-acetate in accordance with Examples 1 C to 1 E, there are obtained the corresponding 3-fluoro-1-methyl-5-(arylidene cyclopentadienyl)-2-acetic acid compounds.

EXAMPLE 6

3-Allyloxy-1-methyl-5-(p-methylsulfinylbenzylidene cyclopentadienyl)-2-acetic acid A. Ethyl 3-methylcyclopent-2-enone-2-acetate A cold solution of sodium nitrite (0.3 mole) in water (100 ml.) is dropped into a stirred mixture of ethyl 3-amino-1-methylcyclopentadienyl acetate (0.28 mole) in a solution of ethanol (100 ml.) and 2.5 N hydrochloric acid (100 ml.) at 0° to 5° so that the temperature does not rise above 5°. After stirring for 2 hours at this temperature, the temperature is raised slowly over 2 hours to 80° until all the ethanol and nitrogen has come off. The aqueous solution is extracted into ether (3 × 300 ml.) and the combined organic layers washed with water (1 × 50 ml.), separated and dried ($MgSO_4$). The filtered solution is evaporated to dryness to give ethyl 3-methyl-cyclopent-2-enone-2-acetate.

B. Ethyl 1-methyl-3-allyloxycyclopentadienyl-2-acetate

A mixture of ethyl 3-methylcyclopent-2-enone-2-acetate (0.2 mole), alkylbromide (0.2 mole) and dry powdered potassium carbonate (0.6 mole) are refluxed with stirring in acetone (100 ml.) under nitrogen for 24 hours. The reaction mixture is filtered and evaporated to dryness. The residual oil is chromatographed on silicagel (60–100 mesh) 2 ft. × 2 in. using mixtures of n-hexane-ether alcohol as eluants to give ethyl 1-methyl-3-allyloxycyclopentadienyl-2-acetate as an oil.

C. 3-Allyloxy-1-methyl-5-(p-methylsulfinylbenzylidene cyclopentadienyl)-2-acetic acid The procedure of Example 2 B is used replacing ethyl 1-methyl-3-dimethylamino cyclopentadiene-2-acetate with an equivalent amount of ethyl 1-methyl-3-allyloxy cyclopentadiene-2-acetate and the product therefrom reacted in accordance with Example 2 C to obtain the subject compound.

Similarly when the aldehydes mentioned below and ethyl 1-methyl-3-allyloxy cyclopentadienyl-2-acetate are reacted in accordance with Examples 2 B and C, there is obtained the below mentioned products.

| Aldehyde Used | Product |
| --- | --- |
| p-methylsulfinylcinnamaldehyde | 3-cyano-1-methyl-5-(p-methylsulfinylcinnamylidene cyclopentadienyl)-2-acetic acid |
| p-methylsulfinylpropargaldehyde | 3-cyano-1-methyl-5-(p-methylsulfinylpropargylidene cyclopentadienyl)-2-acetic acid |
| p-chlorobenzaldehyde | 3-cyano-1-methyl-5-(p-chlorobenzylidene cyclopentadienyl)-2-acetic acid |
| p-fluorobenzaldehyde | 3-cyano-1-methyl-5-(p-fluorobenzylidene cyclopentadienyl)-2-acetic acid |
| p-methylthiobenzaldehyde | 3-cyano-1-methyl-5-(p-methylthiobenzylidene cyclopentadienyl)-2-acetic acid |
| p-methylsulfinylphenylglyoxal | 3-cyano-1-methyl-5-(p-methylsulfinylphenacylidene cyclopentadienyl)-2-acetic acid |
| isonicotinaldehyde | 3-cyano-1-methyl-5-(p-isonicotinylidene cyclopentadienyl)-2-acetic acid |

Similarly when the other aldehydes mentioned in Example 2 are reacted with ethyl 3-allyloxy-1-methyl cyclopentadiene-2-acetate in accordance with Examples 1 C to 1 E, there are obtained the corresponding 3-allyloxy-1-methyl-5-(arylidene cyclopentadienyl)-2-acetic acid compounds.

EXAMPLE 7

3-Amino-1-methyl-5-(p-methylsulfinylbenzylidene cyclopentadienyl)-2-aceto-β-D-glucopyranosiduronic acid Sodium methoxide (25% solution, 30 ml.) is added to a stirred solution of 3-amino-1-methyl-5-(p-methylsulfinylbenzylidene cyclopentadienyl)-2-acetic acid (0.13 mole) in tetrahydrofuran (800 ml.). The precipitate is filtered off and dried at 60°C under vacuum.

Methyl (tri-O-acetyl-α-D-glucopyranosylbromide)-uronate is made according to a procedure described in *J. Amer. Chem. Soc.* 77 3310 (1955) or *J. Amer. Chem. Soc.* 82 2827 (1960).

The dry sodium salt (0.1 mole) and the bromopyranoside (0.12 mole) are heated in dry dimethyl sulfoxide with stirring at 60° for 2 hours. The product was used as is, the free acid, is a biproduct of the next reaction.

The crude product (13 gm.) is dimethoxyethane (125 ml.) and 2.5 N hydrochloric acid (62.5 ml.) is heated to 90° for 3 hours. The solution is evaporated at 70° to ½ volume and extracted with methylene chloride (2 × 30 ml.). The solution is then saturated with sodium chloride and extracted with methylene chloride again (30 ml.). Then ethyl acetate (2 × 50 ml.) and this last extraction washed with water (20 ml.), dried (anhydrous magnesium sulfate), filtered and evaporated to dryness. In this way, the glucuronide is isolated from the starting material.

Using the same reaction procedures and techniques, the following glucoronides are obtained in accordance with the procedure of Example 7.

| STARTING MATERIAL | PRODUCT |
|---|---|
| 1-methyl-5-(p-methylsulfinyl-benzylidene cyclopentadienyl)-2-acetic acid | 1-methyl-5-(p-methylsulfinylbenzylidene cyclopentadienyl)-2-aceto-β-D-glucopyranosiduronic acid |
| 3-fluoro-1-methyl-5-(p-methylsulfinylbenzylidene cyclopentadienyl)-2-acetic acid | 3-fluoro-1-methyl-5-(p-methylsulfinylbenzylidene cyclopentadienyl)-2-aceto-β-D-glucopyranosiduronic acid |
| 3-nitro-1-methyl-5-(p-methylsulfinylbenzylidene cyclopentadienyl)-2-acetic acid | 3-nitro-1-methyl-5-(p-methylsulfinylbenzylidene cyclopentadienyl)-2-aceto-β-D-glucopyranosiduronic acid |
| 3-dimethylamino-1-methyl-5-(p-methylsulfinylbenzylidene cyclopentadienyl)-2-acetic acid | 3-dimethylamino-1-methyl-5-(p-methylsulfinylbenzylidene cyclopentadienyl)-2-aceto-β-D-glucopyranosiduronic acid |
| 3-chloro-1-methyl-5-(p-methylsulfinylbenzylidene cyclopentadienyl)-2-acetic acid | 3-chloro-1-methyl-5-(p-methylsulfinylbenzylidene cyclopentadienyl)-2-aceto-β-D-glucopyranosiduronic acid |
| 3-cyano-1-methyl-5-(p-methylsulfinylbenzylidene cyclopentadienyl)-2-acetic acid | 3-cyano-1-methyl-5-(p-methylsulfinylbenzylidene cyclopentadienyl)-2-aceto-β-D-glucopyranosiduronic acid |
| 3-allyloxy-1-methyl-5-(p-methylsulfinylbenzylidene cyclopentadienyl)-2-acetic acid | 3-allyloxy-1-methyl-5-(p-methylsulfinylbenzylidene cyclopentadienyl)-2-aceto-β-D-glucopyranosiduronic acid |

EXAMPLE 8

3-Amino-1-methyl-5-(p-methylsulfinylbenzylidene cyclopentadienyl)-2-acetic anhydride A solution of 0.05 mole of N,N'-dicyclohexyl carbodiimide in 60 ml. of tetrahydrofuran is added to 0.05 mole of 3-amino-1-methyl-5-(p-methylsulfinylbenzylidene cyclopentadienyl)-2-acetic acid in 25 ml. of tetrahydrofuran. The reaction mixture is shaken vigorously at about 25° for 16 hours. The dicyclohexylurea is filtered off and 2 ml. of glacial acetic acid is added to the filtrate. The solution is allowed to stand for 1 hour, filtered and 200 ml. of ether added to the filtrate. The filtrate is then extracted well with water, dried and concentrated. The desired product is purified by column chromatography on silica-gel using ether-petroleum ether as an eluant.

Similarly when other cyclopentadienyl-2-acetic acid compounds obtained from Examples 1 to 5 are used in equivalent amount in place of 3-amino-1-methyl-5-(p-methylsulfinylbenzylidene cyclopentadienyl)-2-acetic acid in the above example, there are obtained the corresponding anhydrides.

EXAMPLE 9

3-Amino-1-methyl-5-(p-methylsulfinylbenzylidene cyclopentadienyl)-2-acetamide

3-Amino-1-methyl-5-(p-methylsulfinylbenzylidene cyclopentadienyl)-2-acetic acid (0.01 mole) is warmed with thionyl chloride (5 ml.) for 25 minutes. The mixture is cooled to 25° and poured with stirring into ice-cold concentrated ammonia solution. The precipitated amide is washed with water, dried and recrystallized from methanolwater to yield the subject compound.

Similarly when ammonia is replaced by an equivalent amount of the following amines, the corresponding amides are obtained:
Morpholine,
Dimethylamine,
Ethanolamine,
Benzylamine,
N,N-diethylethylenediamine,
Benzylglycinate,
Piperidine,
Pyrrolidine,
N-methylpiperazine,
N-phenylpiperazine,
N-hydroxyethylpiperazine,
Piperazine,
Diethylamine,
Diethanolamine,
Aniline,
p-Ethoxyaniline,
p-Chloroaniline,
p-Fluoroaniline,
p-Trifluoromethylaniline,
Butylamine,
Cyclohexylamine,
Methylamine,
D-glucosamine,
Tetra-O-acetyl-d-glucosamine,
D-galactosylamine,
D-mannosylamine,
N,N-dimethylglycine amide,
N,N-dibutylglycine amide,
N-methyl-2-aminomethylpiperidine,
N-methyl-2-aminomethylpyrrolidine,
β-Ethoxyethylamine,
Di-(β-ethoxyethyl)amine
β-Phenethylamine,
α-Phenethylamine,
Dibenzylamine, and
D-mannosamine Similarly when 1-methyl-5-(p-methylsulfinylbenzylidene cyclopentadienyl)-2-acetic acid, 3-fluoro-1-methyl-5-(p-methylsulfinylbenzylidene cyclopentadienyl)-2-acetic acid, 3-nitro-1-methyl-5-(p-methylsulfinylbenzylidene cyclopentadienyl)-2-acetic acid, 3-dimethylamino-1-methyl-5-(p-methylsulfinylbenzylidene cyclopentadienyl)-2-acetic acid, 3-chloro-1-methyl-5-(p-methylsulfinylbenzylidene cyclopentadienyl)-2-acetic acid, 3-cyano-1-methyl-5-(p-methylsulfinylbenzylidene cyclopentadienyl)-2-acetic acid and 3-alkyloxy-1-methyl-5-(p-methylsulfinylbenzylidene cyclopentadienyl)-2-acetic acid are used in place of an equivalent amount of 3-amino-1-methyl-5-(p-methylsulfinylbenzylidene cyclopentadienyl)-2-acetic acid in the above example, the corresponding amides are formed.

EXAMPLE 10 t-Butyl 3-amino-1-methyl-5-(p-methylsulfinylbenzylidene cyclopentadienyl)-2-acetate 3-Amino-1-methyl-5-(p-methylsulfinylbenzylidene cyclopentadienyl)-2-acetic acid (0.01 mole) is added to isobutylene (30 ml.) and concentrated sulfuric acid (0.1 ml.). The mixture is stoppered securely and shaken at 25° for 18 hours, chilled to 0° and the whole poured into a separatory funnel containing ether (50 ml.), water (25 ml.), ice (25 ml.) and sodium hydroxide (1.0 g.). The layers are separated, the water layer extracted with ether (2 × 40 ml.), the ethereal extracts washed with water and saturated salt solution and dried ($MgSO_4$). The ethereal extract is concentrated to dryness and the residue crystallized from ethyl acetate-n-hexane to yield the subject compound.

EXAMPLE 11

Ammonium 3-amino-1-methyl-5-(p-methylsulfinylbenzylidene cyclopentadienyl)-2-acetate To 3-amino-1-methyl-5-(p-methylsulfinylbenzylidene cyclopentadienyl)-2-acetic acid (0.001 mole) in methanol (10 ml.) is added methanolic ammonia (1 N, 1 ml.). The mixture is evaporated to dryness to yield the subject compound.

EXAMPLE 12

Calcium 2-chloro-1-methyl-5-(p-methylsulfinylbenzylidene cyclopentadienyl)-2-acetate To a slurry of 3-chloro-1-metehyl-5-(p-methylsulfinylbenzylidene cyclopentadienyl)-2-acetic acid (0.002 mole) in water (10 ml.) is added hydrated calcium oxide (0.076 g., 0.001 mole) and the mixture stirred for 15 minutes. The mixture is concentrated to dryness in vacuo, slurried with methanol (10 ml.) and again concentrated to dryness to yield the subject compound.

EXAMPLE 13

Aluminum 3-cyano-1-methyl-5-(p-methylsulfinylbenzylidene cyclopentadienyl)-2-acetate To a solution of aluminum tert-butoxide (0.246 g., 0.001 mole) in eether (50 ml.) is added 3-cyano-1-methyl-5-(p-methylsulfinylbenzylidene cyclopentadienyl)-2-acetic acid (0.003 mole) in pyridine (50 ml.) with stirring at 10°. The mixture is concentrated to dryness in vacuo to yield the subject compound.

EXAMPLE 14

Sodium 3-nitro-1-methyl-5-(p-methylsulfinylbenzylidene cyclopentadienyl)-2-acetate To 3-nitro-1-methyl-5-(p-methylsulfinylbenzylidene cyclopentadienyl)-2-acetic acid (0.001 mole) in methanol is added methanolic sodium methoxide (0.1 N, 10 ml.). The mixture is concentrated to dryness in vacuo to yield the subject compound.

EXAMPLE 15

Methoxymethyl 3-amino-1-methyl-5-(p-methylsulfinylbenzylidene cyclopentadienyl)-2-acetate Chloromethyl methyl ether (0.055 mole) is added to a suspension of 3-amino-1-methyl-5-(p-methylsulfinylbenzylidene cyclopentadienyl)-2-acetic acid (0.05 mole) and anhydrous potassium carbonate (0.15 mole) in 250 ml. of anhydrous acetone. The mixture is allowed to stir overnight at room temperature. Diethyl ether is added (about 200 ml.) and the mixture is filtered. The filtrate is washed once with 100 ml. of water and dried over anhydrous sodium sulfate. It is then filtered and the solvent is removed in vacuo. The residue is chromatographed on 200 g. of acid-washed alumina, using ether-petroleum ether (varying from 10 to 60% ether by volume) as eluant, to give the subject compound.

EXAMPLE 16

β-Dimethylaminoethyl 3-dimethylamino-1-methyl-5-(p-methylsulfinylbenzylidene cyclopentadienyl)-2-acetate A solution of 0.0054 mole of N, N'-dicyclohexyl carbodiimide in 6 ml. of anhydrous tetrahydrofuran is added to a solution of 3-dimethylamino-1-methyl-5-(p-methylsulfinylbenzylidene cyclopentadienyl)-2-acetic acid (0.005 mole) and 2-diethylaminoethanol (0.0054 mole) in 17 ml. of anhydrous tetrahydrofuran. The mixture is stirred at ambient temperature overnight. The dicyclohexylurea is removed by filtration and 2 ml. of glacial acetic acid is added to the filtrate. After the mixture has stood for one hour, it is filtered and 200 ml. of ether is added to the filtrate. The solution is then extracted three times with 100 ml. of 2.5 N HCl and the extracts are combined, washed twice with 100 ml. of ether, ice-cooled, made slightly alkaline with concentrated $NHH_4OH$ and extracted three time with 100 ml. of ether. The ether extracts are combined, washed ten times with 100 ml. of water to remove traces of starting amine, dried over anhydrous potassium carbonate, filtered and evaporated in vacuo. The oily residue is the subject compound.

When 2-dimethylaminoethanol, 3-dimethylamino-1-propanol, 3-diethylamino-1-propanol, N-β-hydroxyethylpiperidine, N-β-hydroxyethylpyrrolidine, N-hydroxymethylpyrrolidine, N-methyl-2-hydroxymethylpyrrolidine, N-ethyl-2-hydroxymethylpiperidine, 1-β-hydroxyethyl-4'-methylpiperazine or N-β-hydroxyethyl morpholine is used in the above procedure in place of 2-diethylaminoethanol, the corresponding β-dimethylaminoethyl, γ-dimethylaminopropyl, γ-diethylaminopropyl, β-N-piperidinylethyl, β-N-pyrrolidinylethyl, N-pyrrolidinylmethyl, α'-(1'-methylpyrrolidinylmethyl), 4-methyl-1-piperazinylethyl, N-ethyl-2-piperidinylethyl and N-morpholinylethyl esters are obtained.

EXAMPLE 17

Ethyl 3-amino-1-methyl-5-(p-methylsulfinylbenzylidene cyclopentadienyl)-2-acetate A mixture of 0.1 mole of 3-amino-1-methyl-5-(p-methylsulfinylbenzylidene cyclopentadienyl)-2-acetic acid, 0.2 g. of p-toluene sulfonic acid, 100 ml. of absolute ethanol and 75 ml. of dry benzene is refluxed on a steam bath while slowly distilling the solvent. After 17 hours the residual solvent is removed under reduced pressure. The residue is slurried in aqueous sodium bicarbonate and then with water until neutral. The resulting ethyl ester is recrystallized from ethyl acetate.

Similarly when methanol, propanol, t-butanol or benzyl alcohol are used in place of ethanol in the above example, there is obtained the corresponding ester.

Similarly, when 1-methyl-5-(p-methylsulfinylbenzylidene cyclopentadienyl)-2-acetic acid, 3-fluoro-1-methyl-5-(p-methylsulfinylbenzylidene cyclopentadienyl)-2-acetic acid, 3-nitro-1-methyl-5-(p-methylsulfinylbenzylidene cyclopentadienyl)-2-acetic acid, 3-dimethylamino-1-methyl-5-(p-methylsulfinylbenzylidene cyclopentadienyl)-2-acetic acid, 3-chloro-1-methyl-5-(p-methylsulfinylbenzylidene cyclopentadienyl)-2-acetic acid, 3-cyano-1-methyl-5-(p-methylsulfinylbenzylidene cyclopentadienyl)-2-acetic acid and 3-alkyloxy-1-methyl-5-(p-methylsulfinylbenzylidene cyclopentadienyl)-2-acetic acid are used in place of the 3-amino compound in the above example, there is obtained the corresponding ethyl ester.

EXAMPLE 18

A mixture of 25, 100 or 500 parts of 3-amino-1-methyl-5-(p-methylsulfinylbenzylidene cyclopentadienyl)-2-acetic acid and 25 parts of lactose is granulated with suitable water, and to this is added 100 parts of maize starch. The mass is passed through a 16 mesh screen. The granules are dried at a temperature below 60°C. The dry granules are passed through a 16 mesh screen and mixed with 3.8 parts of magnesium stearate. They are then compressed into tablets suitable for oral administration.

EXAMPLE 19

A mixture of 50 parts of 3-cyano-1-methyl-5-(p-methylsulfinylbenzylidene cyclopentadienyl)-2-acetic acid, 3 parts of calcium salt of lignin sulphonic acid and 237 parts of water is ball-milled until the size of substantially all of the particles of the sulfone is less than 10 microns. The suspension is diluted with a solution containing 3 parts of sodium carboxymethyl cellulose and 0.9 part of the butyl ester of p-hydroxy benzoic acid in 300 parts of water. There is thus obtained an aqueous suspension suitable for oral administration for therapeutic purposes.

What is claimed is:
1. A compound of the formula:

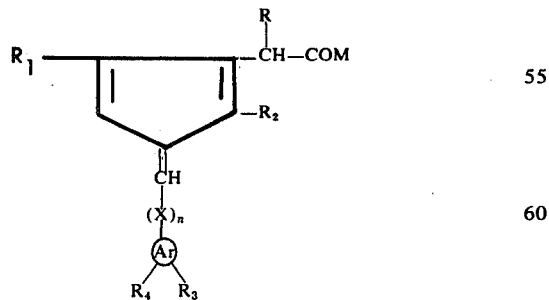

wherein:
R and $R_2$ are each hydrogen or alkyl;
$R_1$, $R_3$ and $R_4$ are each hydrogen, halogen, alkyl, alkoxy, amino, alkenyloxy, alkylamino, dialkylamino, alkylthio, alkylsulfinyl, alkylsulfonyl, trihaloalkyl, dialkylaminoalkyl, dialkylaminoalkoxy, cyano, alkanoyl, nitro, hydroxy, alkanoyloxy, alkanoylamino, aminoalkyl, alkylaminoalkyl, hydroxyalkyl, alkoxyalkyl, alkylthioalkyl, aryl, aryloxy, aralkyl, —$SO_3H$ or sulfonamido; at least one of $R_1$, $R_3$ or $R_4$ being cyano;
Ar is phenyl; and
M is hydroxy, alkoxy or NR'R" wherein R' and R" are each hydrogen or $C_{1-5}$ alkyl;
X is alkylene, alkenylene, alkynylene, O, S, carbonyl, sulfinyl, sulfonyl, or $NR_5$ wherein $R_5$ is hydrogen or alkyl; and
$n$ is 0 or 1.

2. A compound of claim 1 wherein:
R and $R_2$ are each hydrogen or $C_{1-5}$ alkyl;
$R_1$ is hydrogen, halogen, $C_{1-5}$ alkyl, $C_{1-5}$ alkoxy, $C_{2-5}$ alkenyloxy, amino, $C_{1-5}$ alkylamino, $C_{1-5}$ dialkylamino, $C_{1-5}$ alkylthio, $C_{1-5}$ alkylsulfinyl, $C_{1-5}$ alkylsulfonyl, trifluoromethyl, cyano, nitro, hydroxy, $C_{1-5}$ alkanoyloxy or $C_{1-5}$ alkanoylamino;
Ar is phenyl;
$R_3$ and $R_4$ are each hydrogen, halo, $C_{1-5}$ alkyl, $C_{1-5}$ alkylthio, cyano, nitro, trifluoromethyl, $C_{1-5}$ Alkylsulfinyl, $C_{1-5}$ alkylsulfonyl or $C_{1-5}$ alkoxy;
M is hydroxy, $C_{1-5}$ alkoxy or NR'R" wherein R' and R" are each hydrogen or $C_{1-5}$ alkyl; and
$n$ is 0; or the ammonium, alkali or alkali earth metal salt of the acid.

3. A compound of claim 1 wherein:
R is hydrogen;
$R_2$ is $C_{1-5}$ alkyl;
$R_1$ is hydrogen, amino, $C_{1-5}$ dialkylamino, nitro, halo, cyano or $C_{2-5}$ alkenyloxy;
M is hydroxy or $C_{1-5}$ alkoxy;
Ar is phenyl;
$n$ is 0; and
$R_3$ and $R_4$ are each hydrogen, halo, $C_{1-5}$ alkyl, $C_{1-5}$ alkylthio, cyano, nitro, trifluoromethyl, $C_{1-5}$ alkylsulfinyl, $C_{1-5}$ alkylsulfonyl or $C_{1-5}$ alkoxy.

4. 3-Cyano-1-methyl-5-(p-methylsulfinylbenzylidene cyclopentadienyl)-2-acetic acid.

* * * * *